United States Patent [19]
Fricke et al.

[11] 3,802,556
[45] Apr. 9, 1974

[54] PROCESS FOR ELECTROSTATIC DRESSING AND/OR WORKING UP OF SALT AND MINERAL MIXTURES

[75] Inventors: Gunter Fricke, Neuhof; Arno Singewald, Kassel, both of Germany

[73] Assignee: Wintershall Aktiengesellschaft, Kassel, Germany

[22] Filed: Apr. 23, 1973

[21] Appl. No.: 353,718

Related U.S. Application Data

[63] Continuation of Ser. No. 31,030, March 26, 1970, abandoned.

[52] U.S. Cl. ................................. 209/9, 209/127
[51] Int. Cl. ............................................ B03b 1/04
[58] Field of Search ................. 209/4, 9, 11, 127

[56] References Cited
UNITED STATES PATENTS

| | | | |
|---|---|---|---|
| 3,388,794 | 6/1968 | Peuschel | 209/9 |
| 3,480,139 | 11/1969 | Fricke et al. | 209/9 |
| 3,073,447 | 1/1963 | Autenrieth et al. | 209/127 |
| 3,477,566 | 11/1969 | Autenrieth et al. | 209/9 |
| 3,591,093 | 7/1971 | Berthon et al. | 209/9 X |

FOREIGN PATENTS OR APPLICATIONS

| | | | |
|---|---|---|---|
| 583,176 | 12/1946 | Great Britain | 209/127 |
| 665,730 | 6/1963 | Canada | 209/11 |

*Primary Examiner*—Frank W. Lutter
*Assistant Examiner*—William Chuchlinski, Jr.
*Attorney, Agent, or Firm*—Michael S. Striker

[57] ABSTRACT

Process in which raw or crude salt and mineral mixture are intensively mixed with an aliphatic, unbranched fatty acid having a chain length of three to 18 carbon atoms or with an aromatic carboxylic acid or with mixtures of said aliphatic and aromatic acids and an ammonium salt of a lower aliphatic acid, and thereafter treated with air having a relative humidity of 5 to 40 percent in an electrostatic separation zone at a temperature of about 15° to about 40° C.

7 Claims, No Drawings

PROCESS FOR ELECTROSTATIC DRESSING AND/OR WORKING UP OF SALT AND MINERAL MIXTURES

This is a continuation, of application Ser. No. 31,030, filed Mar. 26, 1970 now abandoned.

The process is particularly suitable for separating Kieserite from crude salt mixtures obtained in the potassium industry, separating a carbonate, as for instance $MgCO_3$, and/or an oxide or fluoride, as for instance CaF, from various mineral and salt mixtures containing the same.

This invention relates to a process of dressing and/or working up mineral and salt mixtures for the separation of certain components therefrom.

Kieserite ($MgSO_4 \cdot H_2O$) occurs in natural potassium salt mineral deposits associated with Sylvanite and rock salts as a main or secondary component thereof. Kieserite occurs as the main mineral component in hard salts.

In the processing of minerals for obtaining potassium therefrom, kieserite is recovered with the rock salt in the residues, i.e., in the form of a potassium poor residue following separation of the potassium.

For separating the kieserite from the potassium residues, many processes are known. For example, it has been proposed that crude kieserite be purified, that is, that the kieserite be separated from the accompanying substances through multi-stage washing and filtering steps.

For some time, the recovery of kieserite has been carried out by foam flotation procedures. In this type of process, the kieserite as well as the residue must be recovered at considerable expense from the salt water (brine) containing the same by filtration or centrifugation and the product thus obtained must then be freed from the remaining damp residues containing the same.

In German Pat. No. 1,078,961, an electrostatic process for the preparation of kieserite is described, according to which each ton of the material to be worked up is treated with 100g to 600g 2,4-dichlorophenoxy acetate and then electrostatically separated at a temperature of above 120°C.

This process has the disadvantage that it requires considerable amounts of an expensive chemical compound and also makes necessary the use of high temperatures. Further in this process there must be observed a definite order or sequence of separating the component materials. The presence of 2,4-dichlorophenoxy acetate exerts an inhibitory effect on the following electrostatic separation of rock salt (Sylvanite). The recovery of both components is only possible with this process, if first the Sylvanite is separated with the aid of a KCl selective additive and if then the kieserite is recovered by means of 2,4-dichlorophenoxy acetate from the Sylvanite residue. This type of process requires in all cases large amounts of the conditioning agent. Further, the duplicated steps of conditioning and separating gives rise to considerable technical expense which contributes considerably against any widespread acceptance of the process.

In Auslegeschrift 1,261,453 (U.S. Pat. Application Ser. No. 651,653), an electrostatic process is described which is characterized in that the materials to be dressed are treated with highly dispersed water adsorption agents and fatty acids and in that the mixture is warmed with air having a relative humidity of, for example, 3 to 10 percent. The separation temperatures used in this process amount to about 40° to 80°C.

The object of this invention is to provide an economically feasible and simple process for separating salt and mineral mixtures into their various components.

Another object is to provide a process for separating mineral and salt mixtures, such as the crude salt mixtures obtained in the potassium industry, liquid spar, carbonate, fluoride and oxide mixtures, into their components by electrostatic means.

Still another object is to provide such a process utilizing for the electrostatic separation, air having a relative humidity of 5 to 40 percent and low temperatures ranging from about 15° to 40°C.

These and other objects and advantages will become apparent from the following description.

The process is particularly suitable for use in the working of the crude salt mixtures obtained in the potassium industry, for instance hard salts or kieserite residues. In addition, it is advantageously employed in the working of other mineral and salt mixtures such as for recovering $MgCO_3$ from carbonate mixtures, for recovering an oxide or fluoride such as CaF from mixtures containing the same.

In carrying out the process of the invention, the material to be worked up is intensively mixed with a) an aliphatic, unbranched fatty acid having a chain length of three to 18 carbon atoms and preferably five to 12 carbon atoms, or with b) an aromatic carboxylic acid, or with c) a mixture of an aliphatic and aromatic acid or any of (a), (b), or (c) with an ammonium salt of a lower aliphatic acid and preferably ammonium formiate or ammonium acetate, and thereafter treating the resulting mixture with air having a relative humidity of 5 to 40 percent and preferably 10 to 30 percent in an electrostatic treatment zone.

By the process of the invention, the expensive costly foaming and filtering procedures of the wet mechanical processes are eliminated.

In contrast to the aforementioned procedure as described in German Patent No. 1,078,961, the considerable costs for conditioning agents are avoided, as in the process of the invention, very inexpensive and readily available materials are used for conditioning agents. In the process of the invention, the plant is also considerably simplified.

As a result, a further cost savings is realized and additionally a higher degree of safety is ensured.

A further advantage of the invention lies in that after recovery of the kieserite, Sylvanite can be recovered without any further addition of conditioning agent to the crude salt. Still further the process has the advantage that it utilizes essentially lower separation temperatures as a result of which a savings in energy costs are also realized.

The process of the invention will be further described in the following examples but the invention is in no wise to be construed as limited thereby.

EXAMPLE 1 - 25

The examples, the results of which are set out in Table 1 represents the recovery of kieserite from a crude potassium salt containing about 12% $K_2O$ and about 28% kieserite, using a separation temperature of 35°C, corresponding to 20% relative humidity of 7.5g $H_2O/m^3$ air, absolute air himidity, in a plate free fall separator. Following a single throughput, the following results were obtained:

TABLE I

| Ex. No. | Conditioning Agent | g/t | Kieserite conc. | Content % residue | Kieserite yield % |
|---|---|---|---|---|---|
| 1. | 2,4-dichlorophenoxy acetate (German Pat. 1,078,961) | 300 | 26.1 | 25.5 | 15.1 |
| 2. | Silicic acid KS 404<br>Fatty acid $C_5$—$C_9$ | 200<br>150 | 26.6 | 24.1 | 14.8 |
| 3. | Fatty acid $C_5$—$C_9$ | 150 | 17.5 | 30.7 | — |
| 4. | Salicyclic acid | 150 | 19.9 | 28.4 | — |
| 5. | ammonium acetate<br>fatty acid $C_5$—$C_9$ | 100<br>150 | 54.6 | 5.5 | 89.4 |
| 6. | ammonium formiate<br>fatty acid $C_5$—$C_9$ | 100<br>150 | 43.7 | 7.5 | 88.3 |
| 7. | ammonium acetate<br>salicyclic acid | 100<br>150 | 53.5 | 5.3 | 90.0 |
| 8. | ammonium acetate<br>benzoic acid | 100<br>150 | 55.1 | 5.0 | 90.4 |
| 9. | ammonium acetate<br>abietic acid | 100<br>150 | 50.6 | 6.1 | 89.0 |
| 10. | ammonium formiate<br>abietic acid | 100<br>150 | 43.7 | 7.5 | 88.3 |

In the Table, column 1, of the table, shows the conditioning agent used, column 2, the kieserite content in the fraction, and column 3, the kieserite yield.

Examples 5 to 10 which correspond to the process of the invention, show a 20 to 30 percent higher preconcentrate than the comparison Examples 1–4. The kieserite yield in accordance with the invention amounts to from 70 to 75 percent higher than that obtained in Examples 1–4.

The Examples in Table 2 show the recovery of kieserite recovered from a crude potassium salt containing 13.8% $K_2O$ and 33.3% kieserite, the use of a separation temperature of between 15° and 40°C, corresponding to 10 to 40% relative humidity in the warming air. The crude salt is treated with 150g/ton of a fatty acid having five to nine carbon atoms and 150g/ton ammonium acetate. After a single throughput in the free fall separator, the following results were obtained:

TABLE II

| Example No. | Separation temp. °C. | Relative humidity percent | Kieserite content, percent | | Kieserite proportion, percent | |
|---|---|---|---|---|---|---|
| | | | Conc. | Residue | Conc. | Residue |
| 11 | 15 | 40 | 56.2 | 14.4 | 57 | 8 |
| 12 | 20 | 30 | 63.5 | 13.3 | 62 | 8 |
| 13 | 26 | 20 | 65.6 | 10.4 | 64 | 8 |
| 14 | 40 | 10 | 70.4 | 8.6 | 69 | 8 |

In the Table, in the last column, the Kieserite portion in percentage is given, under which the amount of kieserite of a single throughput is to be understood, this therefore not being identical with the final yield of a continuous process. The kieserite remaining in the intermediate fraction, i.e., the differences to 100 percent are not shown in the Table. The technical advance of the process of the invention can be especially well seen from Examples 11–14 of Table 2. The separation can be carried out at or near room temperature.

Particularly good results are realized if in addition to the designated conditioning agent, the starting material is also treated with a water adsorption agent, as for instance, with a molecular sieve, disperse or granular silicic acid. It is then possible to increase the relative himidity in the warming air to about 50 percent, whereby a further temperature decrease of 5°C can be realized.

The separation of kieserite from the preconcentrate succeeds particularly well according to the process of the invention when the latter is not further conditioned.

The Examples in Table 3 are directed to the recovery of kieserite from a crude potassium salt containing 13.3% $K_2O$ and 26.1% kieserite at 30°C, corresponding to a 25 percent relative humidity in the warming air, in the free fall separator. The preconcentrate was separated once more without being further conditioned.

When 2,4-dichlorophenoxy acetate (Example 16) as described in German Pat. No. 1,078,961 was used at a relative humidity of 25 percent, no selective loading of the kieserite was obtained. The comparative Example 15 uses fatty acid ($C_5$–$C_9$), Example 17 fatty acid and ammonium carbonate and Example 18 fatty acid and water containing soda and yield only kieserite concentrates containing 60 to 63% $MgSO_4 \cdot H_2O$. Ammonium carbonate and sodium carbonate exert no influence on the separation yields of kieserite. The after concentrates of Examples 19–22 obtained in accordance with the process of the invention, show a 25 to 35 percent higher kieserite content than the after concentrates according to the comparison Examples.

TABLE III

| Ex. No. | Conditioning Agent | g/t | Kieserite % preconcentrate | after conc. | Yield % |
|---|---|---|---|---|---|
| 15. | fatty acid $C_5$—$C_9$ | 150 | 33.2 | 61.8 | 45.1 |
| 16. | 2,4-dichlorophenoxy acetate (Ger. Pat. 1,078,961) | 300 | 26.1 | 17.5 | — |
| 17. | ammonium carbonate<br>fatty acid $C_5$—$C_9$ | 100<br>150 | 31.0 | 60.4 | 58.5 |
| 18. | sodium carbonate<br>fatty acid $C_5$—$C_9$ | 100<br>150 | 30.5 | 63.7 | 61.9 |
| 19. | ammonium acetate<br>fatty acid $C_5$—$C_9$ | 100<br>150 | 44.3 | 91.4 | 87.8 |
| 20. | ammonium acetate<br>O-cresotic acid<br>fatty acid $C_5$—$C_9$ | 100<br>50<br>100 | 52.7 | 94.2 | 86.9 |
| 21. | ammonium acetate<br>salicyclic acid | 100<br>150 | 60.4 | 93.8 | 87.7 |
| 22. | ammonium formiate<br>benzoic acid | 100<br>150 | 42.7 | 85.4 | 81.0 |

According to the process of the invention, kieserite can be recovered from hard salt (impure Sylvite) without first separating out the Sylvite and also from their residues. For carrying out the process of the invention, without further conditioning agents, there are necessary about 100g ammonium formiate or ammonium acetate per ton of residue.

The Examples of Table 4 represent the recovery of kieserite from hard salt residues that originate from a crude salt electrostatic separation. For separating the kieserite, the starting material is treated with 100g ammonium acetate per ton of residue. The separation is carried out at 15° to 40°C in a plate free fall separator.

TABLE IV

| Example No. | Separation Temp. 0°C. | rel. humidity % | Kieserite % starting product Kieserite % | concentrate | Yield |
|---|---|---|---|---|---|
| 23. | 40 | 10 | 70.4 | 95.2 | 85.7 |
| 24. | 20 | 30 | 63.5 | 93.8 | 86.9 |
| 25. | 15 | 40 | 56.2 | 92.7 | 90.1 |

These Examples show that already in a single separation stage a kieserite concentrate containing 92.7 to 95% kieserite, i.e., a yield of 85.7 to 90.1% is realized. The kieserite yeild is, where a decreased temperature is utilized, even further improved. The technical advance of the process of the invention is clearly to be seen from the above Examples.

EXAMPLE 26

The product known as Magno (manufactured by Magno Werk GMBH, Duisberg, Germany) containing 96.0% $CaCO_3$, 1.1% $MgCO_3$, 2.1% $S:O_2$ and 0.8% $Fe_2O_3$ and $Al_2O_3$ was treated with 100g first running fatty acid or with 100g O-cresotic acid and also with 100g technical ammonium acetate (Chemische Fabrik, Lehrte, Germany) per ton of material to be worked. After warming in a drying oven to 40°C, the resulting mixture was separated in a free fall separator at 4 k/Vcm, at a relative air humidity of about 15%.

The following results were obtained for a starting material having the following particle size distribution:

|  | Wt. % |
|---|---|
| larger than 0.5 | 4.5 |
| 0.25–0.5 | 50.6 |
| 0.16–0.25 | 25.4 |
| 0.1–0.16 | 8.5 |
| smaller than 0.1 | 11.0 |

TABLE V

|  | Run A | | | | Run B | | | |
|---|---|---|---|---|---|---|---|---|
|  | Content in percent | | Proportion in percent | | Content in percent | | Proportion in percent | |
|  | Conc. | Residue | Conc. | Residue | Conc. | Residue | Conc. | Residue |
| $CaCO_3$ | 98.8 | 88.7 | 74.4 | 25.6 | 98.5 | 91.8 | 65.0 | 35.0 |
| $MgCO_3$ | 1.0 | 3.0 |  |  | 1.0 | 2.7 |  |  |
| $SiO_2$ | 0.1 | 7.0 | 3.3 | 96.7 | 0.2 | 4.6 | 5.5 | 94.5 |
| $Fe_2O_3 + Al_2O_3$ | .1 | 1.3 | 5.2 | 94.5 | .3 | 1.0 | 10.7 | 89.3 |

There were recovered at the negative electrode a concentrate of highly pure $CaCO_3$ of 98.5%. The $MgCO_3$ is present in the concentrate as dolomite. The impurity minerals $SiO_2$ and $Fe_2O_3 + Al_2O_3$ are substantially completely eliminated and are to be found only in the residue.

EXAMPLE 27

A liquid spar containing 95.3% $CaF_2$, 0.4% $CaCO_3$, 0.03% $MgCO_3$ and 4.2% $SiO_2$ was treated with 100g of a $C_5$–$C_6$ fatty acid and 100 g ammonium acetate per ton of starting material and warmed in a drying oven to 50°C. The electrostatic working up was carried out in a plate free fall separator at 4 kV/cm and a relative humidity of about 12 percent. The starting material had the following sieve analysis:

|  | Wt. % |
|---|---|
| larger than 0.5 | 4.0 |
| 0.25–0.5 | 64.0 |
| 0.16–0.25 | 16.6 |
| 0.1–0.16 | 7.3 |
| smaller than 0.1 | 8.1 |

TABLE VI

|  | CONTENT IN % | | PROPORTION IN % | |
|---|---|---|---|---|
|  | concentrate | residue | concentrate | residue |
| $CaF_2$ | 99.5 | 65.6 | 91.3 | 8.7 |
| $CaCO_3$ | 0.2 | 0.7 | 30.0 | 70.0 |
| $MgCO_3$ | 0.02 | 0.04 | — | — |
| $SiO_2$ | 0.2 | 33.7 | 4.3 | 95.7 |

There was obtained at the negative electrode, a substantially pure liquid spar (over 99 percent pure). $SiO_2$ was found to the extent of 95 percent in the residue and was separated off at the positive electrode. The yield of highly pure liquid spar amounted to 91.3 percent.

We claim:

1. A process for the electrostatical separation of mineral and salt mixtures which comprises rigorously mixing the mineral or salt mixture with a conditioning agent said conditioning agent consisting essentially of a mixture of
    A. a member selected from the group consisting of;
        a. aliphatic, unbranched fatty acids containing three to 18 carbon atoms,
        b. aromatic carboxylic acids,
        c. mixtures of said aliphatic and aromatic acids and
    B. at least one ammonium salt of a lower aliphatic fatty acid
    in the absence of a carrier therefor, and thereafter subjecting the resultant total mixture to treatment with air having a relative humidity of 5 to 40 percent in an electrostatic separation zone at a temperature from about 15° to 40°C.

2. Process according to claim 1 wherein said aliphatic, unbranched fatty acid contains five to 12 carbon atoms.

3. Process according to claim 1 wherein said ammonium salt is a member selected from the group consisting of ammonium acetate and ammonium formiate.

4. Process according to claim 1 wherein said air has a relative humidity of 10 to 30 percent.

5. Process according to claim 1 wherein said ammonium salt is used in an amount of about 50 to about 200 g/ton of starting salt or mineral mixture.

6. Process according to claim 1 wherein said salt or mineral mixture is the crude salt mixture derived in the recovery of potassium.

7. Process according to claim 6 which comprises separating a kieserite concentrate from said crude salt mixture and thereafter recovering a Sylvanite concentrate from the remaining residue.

* * * * *